Patented July 24, 1934

1,967,825

UNITED STATES PATENT OFFICE 1,967,825

BACTERICIDAL COMPOUND

Emil Klarmann, Jersey City, and Louis William Gatyas, Bloomfield, N. J., assignors, by mesne assignments, to Lehn & Fink, Inc., Bloomfield, N. J., a corporation of Delaware No Drawing. Application January 7, 1932, Serial No. 585,390

7 Claims. (Cl. 260—64)

The present invention relates to new compounds having improved and highly effective bactericidal properties.

In accordance with the present invention, we propose new compounds which we have found to possess highly effective bactericidal properties, these compounds being unsymmetrical diphenylmethane derivatives having a hydroxyl group and at least one chlorine substituted in the nuclei thereof, either in the same or in different nuclei, and the homologues of such compounds in which a hydrocarbon radical is attached to the C-atom connecting the nuclei. It is particularly directed to compounds of the type having a hydroxyl group and a single chlorine substituted in the same ring. The compounds of high bactericidal effectiveness prepared in accordance with the present invention may contain substituting halogen or alkyl groups in the other nucleus. We have found the compounds in which the hydroxyl and chlorine groups in the one nucleus are separated by at least one intervening C-atom of the ring to be more highly effective, although the compounds of this type in which the chlorine and hydroxyl groups are in the ortho-position have marked effectiveness.

The compounds of the present invention may suitably be prepared by condensing a phenol with a reactive benzyl derivative, such as a halide or the alcohol, or a homologue, a chlorine being substituted in the nucleus of either the phenol or the benzyl derivative, and preferably the former. Any suitable condensing agent may be employed; for example, anhydrous zinc chloride, aluminum chloride, ferric chloride, mineral acids such as sulfuric acid, or the like. The following examples illustrate typical methods of producing such compounds:

1. 5 parts of anhydrous zinc chloride is incorporated in 36 parts of phenol by heating in an oil bath. The mixture is allowed to cool to room temperature and 53 parts of p-chlorobenzyl chloride is added very slowly with stirring. The reaction is aided by occasional mild heating, say to 50° C. Stirring and heating are continued for about 2 hours after the addition of the p-chlorobenzyl chloride. The product is isolated and purified, suitably by washing with water, treatment with alkali and acid, and vacuum distillation. It is 4'-chloro-4 hydroxydiphenyl methane, melts at 85.5° C. and distills between 175° and 177° C. at 4 mm. pressure. It has a phenol coefficient of 39 with B. typhosus and of 170 with Staph. aureus.

Corresponding compounds with other halogen substituents may be prepared in a similar manner.

2. 10 parts of dry zinc chloride is dissolved in 67.2 parts of parachlorphenol, while mildly heating, as on a water bath. While held at about 50° C., 62.3 parts of benzyl chloride is added slowly and the mixture held at this temperature while being agitated to complete reaction, say for 4 hours. The reaction mixture is then cooled, and extracted with ether. The ether extract, after washing with water, is extracted several times with an aqueous alkaline solution; say a 10% solution of K O H. The alkaline extracts are combined, acidified, the aqueous layer discarded and the uncombined parachlorphenol in the remainder driven off by steam. The residue is then purified by reduced pressure distillation. The fraction distilling over at 160–162° C. at 3.5 mm. absolute is 5-chloro-2 hydroxy diphenylmethane. It solidifies on standing.

This compound has a very high bactericidal effectiveness, its phenol coefficient with respect to B. typhosus being 74 and with respect to Staph. aureus, 213.

By generally similar methods we have prepared numerous other compounds of this type; of which the following are typical:

4'-chloro-4 hydroxy diphenylmethane; melts at 85.5° C.; boils at 175–177° C. at 4 mm. Hg.; phenol coefficient with B. typhosus, 39; with Staph. aureus, 170.

3-chloro-4 hydroxy diphenylmethane; boils at 155–160° C. at 5 mm. Hg.; phenol coefficient with B. typhosus, 36+; with Staph. aureus, 126.

5-chloro-2 hydroxy diphenylmethane; boils at 160–162° C. at 3.5 mm. Hg. solidifies on standing; phenol coefficient with B. typhosus, 74; with Staph. aureus, 213.

3,4'-dichloro-4 hydroxy diphenylmethane, melting point 64° C.; boils at 160–164° C. at 3 mm. Hg.; phenol coefficient with B. typhosus, about 14; with Staph. aureus, 345.

3-chloro-4'-bromo-4 hydroxy diphenylmethane; melting point, 65° C.; boils at 182° C. at 3 mm. Hg.; phenol coefficient, with B. typhosus, 17; with Staph. aureus, over 140.

Compounds of the same type may be obtained by reacting on a halogen substituted alkali phenate such as parachlor-sodium phenate with benzyl chloride or a substituted benzyl chloride in the presence of a non-dissociating solvent, such as toluene.

The effectiveness of compounds of this type we have found to be unimpaired or improved against certain bacteria by the substitution of halogen groups in either ring. Similarly the substitution of alkyl groups for hydrogen attached to the carbon atom connecting the nuclei in such compounds forms substances of high bactericidal value. Iodine may be employed as the substituting halogen or different substituting halogens may be present in the same compound, either in the same or in different rings.

We claim:

1. A chloro-hydroxyl-diphenylmethane having a chlorine and a hydroxyl group substituted in the nuclei thereof, not more than one chlorine atom being substituted in the nucleus having the substituting hydroxyl radical.

2. An unsymmetrical mono-chloro-hydroxyl-substituted diphenylmethane having the chlorine and hydroxyl groups substituted in different rings.

3. A chlorine substituted hydroxyl-diphenylmethane having a chlorine atom and a hydroxyl group substituted in one ring thereof and having the other ring free from substituting hydroxyl groups, not more than one chlorine atom being substituted in the nucleus having the substituting hydroxyl radical, said compound having high bactericidal efficiency.

4. A chlorine substituted hydroxyl-diphenylmethane having a chlorine atom and a hydroxyl group substituted in one ring thereof in non-adjacent positions and having the other ring free from substituting hydroxyl groups, not more than one chlorine atom being substituted in the nucleus having the substituting hydroxyl group, said compound having high bactericidal efficiency.

5. 3-chloro-4 hydroxy diphenylmethane.
6. 5-chloro-2 hydroxy diphenylmethane.
7. 4'-chloro-4 hydroxy diphenylmethane.

EMIL KLARMANN.
LOUIS WILLIAM GATYAS.